United States Patent
Duarte et al.

(10) Patent No.: US 7,221,559 B1
(45) Date of Patent: May 22, 2007

(54) MULTIPURPOSE BUMPER SYSTEM FOR A DATA PROCESSING APPARATUS

(75) Inventors: Matias Duarte, San Francisco, CA (US); Todd Lewis, Mountain View, CA (US)

(73) Assignee: Danger, Inc., Palo Alto, CA (US)

( * ) Notice: Subject to any disclaimer, the term of this patent is extended or adjusted under 35 U.S.C. 154(b) by 254 days.

(21) Appl. No.: 10/921,461

(22) Filed: Aug. 18, 2004

(51) Int. Cl.
*H05K 5/00* (2006.01)

(52) U.S. Cl. ........................ 361/679; 361/681
(58) Field of Classification Search ......... 361/679–683
See application file for complete search history.

(56) References Cited

U.S. PATENT DOCUMENTS

| | | | |
|---|---|---|---|
| 6,580,932 B1 | 6/2003 | Finke-Anlauff | |
| 6,665,173 B2 * | 12/2003 | Brandenberg et al. | 361/680 |
| 6,850,226 B2 | 2/2005 | Finke-Anlauff | |
| 2002/0044136 A1 * | 4/2002 | Griffin et al. | 345/169 |
| 2002/0149567 A1 | 10/2002 | Griffin et al. | |
| 2003/0122784 A1 * | 7/2003 | Shkolnikov | 345/169 |

* cited by examiner

*Primary Examiner*—Yean-Hsi Chang
(74) *Attorney, Agent, or Firm*—Blakely, Sokoloff, Taylor & Zafman, LLP

(57) ABSTRACT

An apparatus is described comprising: a bumper for attaching to and protecting a data processing device, the bumper including one or more input elements formed thereon, the input elements, when selected by a user, to cause the data processing device to perform a plurality of defined functions; and one or more attachment elements configured to interface with portions of the data processing device, the attachment elements thereby fixedly coupling the bumper to the data processing device.

15 Claims, 11 Drawing Sheets

MULTIPURPOSE BUMPER SYSTEM FOR A DATA PROCESSING APPARATUS

BACKGROUND OF THE INVENTION

1. Field of the Invention

This invention relates generally to the field of data processing devices. More particularly, the invention relates to versatile protective bumper configurations for a data processing device.

2. Description of the Related Art

Portable data processing devices such as Personal Digital Assistants ("PDAs") and programmable wireless telephones are becoming more powerful every day, providing users with a wide range of applications previously only available on personal computers. At the same time, due to advances in silicon processing technology and battery technology, these devices may be manufactured using smaller and smaller form factors. Accordingly, users no longer need to sacrifice processing power for portability when selecting a personal data processing device.

Although processing devices with small form factors tend to be more portable, users may find it increasingly difficult to interact with them. For example, entering data may be difficult due to the absence of a full-sized keyboard and reading information may be difficult due to a small, potentially dim Liquid Crystal Display ("LCD").

To deal with this problem, devices have been produced which physically adjust to an "active" position when in use and an "inactive" position when not in use. For example, the well-known Motorola® Star-TAC® wireless telephone flips open when in use, thereby exposing a telephone keypad, a display and an earpiece. However, when this device retracts to an "inactive" position, the keypad, display, and earpiece are all completely inaccessible.

To solve these problems, the assignee of the present application developed a data processing device 100 with an adjustable display 103 as illustrated in FIGS. 1a–c. The data processing device 100 includes a keyboard 101, a control knob/wheel 102 (e.g., for scrolling between menu items and/or data), and a set of control buttons 105 (e.g., for selecting menu items and/or data).

The display 103 is pivotally coupled to the data processing device 100 and pivots around a pivot point 109, located within a pivot area 104, from a first position illustrated in FIG. 1a to a second position illustrated in FIGS. 1b–c. When in the first position the display 103 covers the keyboard 101, thereby decreasing the size of the device 100 and protecting the keyboard 101. Even when the display is in the first position, however, the control knob 102 and control buttons 105 are exposed and therefore accessible by the user. The motion of the display 103 from the first position to a second position is indicated by motion arrow 106 illustrated in FIGS. 1a–b. As illustrated, when in the second position, the keyboard 101 is fully exposed. Accordingly, the display is viewable, and data is accessible by the user in both a the first position and the second position (although access to the keyboard is only provided in the first position).

In one embodiment, the data processing device 100 is also provided with audio telephony (e.g., cellular) capabilities. To support audio telephony functions, the embodiment illustrated in FIGS. 1a–c includes a speaker 120 for listening and a microphone 121 for speaking during a telephone conversation. Notably, the speaker 120 and microphone 121 are positioned at opposite ends of the data processing device 100 and are accessible when the screen 103 is in a closed position and an open position.

SUMMARY

An apparatus is described comprising: a bumper for attaching to and protecting a data processing device, the bumper including one or more input elements formed thereon, the input elements, when selected by a user, to cause the data processing device to perform a plurality of defined functions; and one or more attachment elements configured to interface with portions of the data processing device, the attachment elements thereby fixedly coupling the bumper to the data processing device.

BRIEF DESCRIPTION OF THE DRAWINGS

A better understanding of the present invention can be obtained from the following detailed description in conjunction with the following drawings, in which.

DETAILED DESCRIPTION OF PREFERRED EMBODIMENTS

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Several different multi-purpose input/output and display configurations for a data processing device are described below. As will be apparent from the following description, many of these configurations are particularly beneficial when employed on a dual-purpose data processing device such as a personal digital assistant ("PDA") or other mobile computing device having integrated wireless telephony capabilities (e.g., a combination PDA and cell phone). However, it should be noted that the underlying principles of the invention are not limited to wireless telephony configuration.

Figure 2:
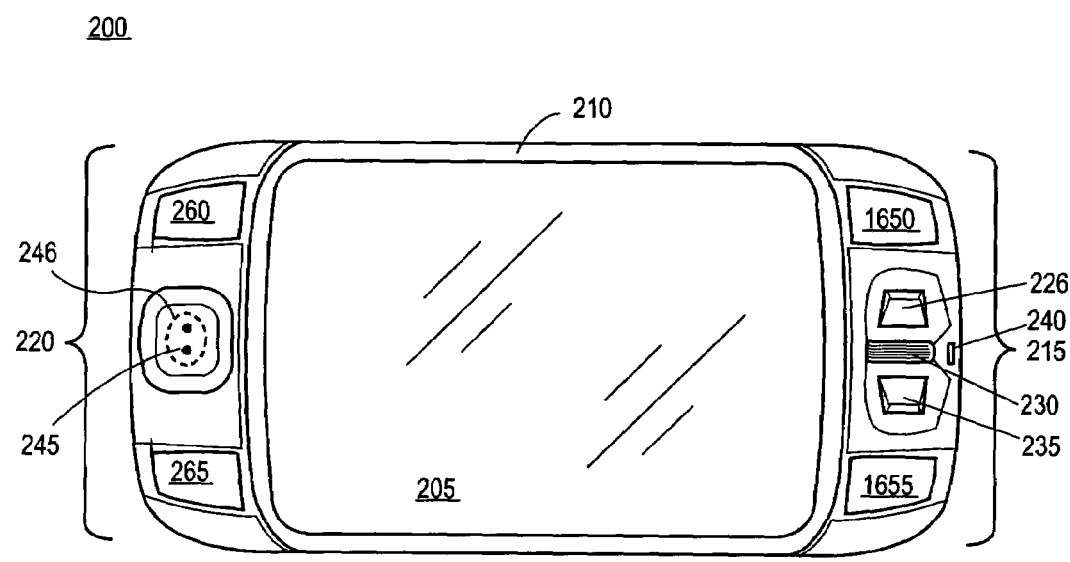
FIGS. 2–3 illustrate a data processing with an adjustable display screen according to one embodiment of the invention.
Figure 3:
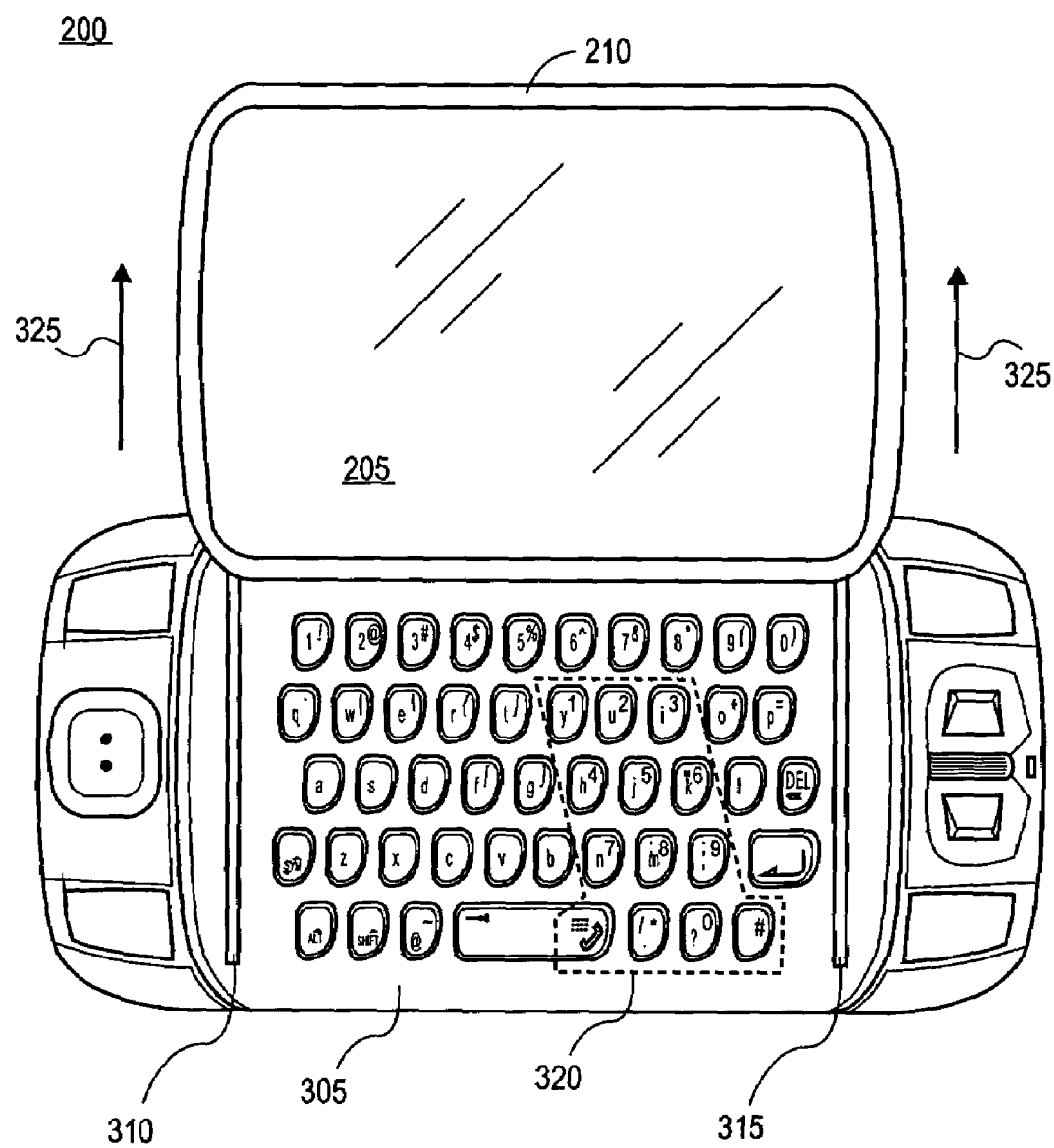

A data processing device 200 according to one embodiment of the invention is illustrated in FIGS. 2–3. The data processing device 200 includes a display 210 with a viewable display area 205 for displaying various types of text and graphics (e.g., graphical navigation menus, email messages, electronic calendars, electronic address books, . . . etc). In one embodiment, the display is a backlit or reflective thin film transistor ("TFT") display. In another embodiment, the display is a transflective SuperTwisted Nematican ("STN") display. However, the underlying principles of the invention are not limited to a particular display type.

The data processing device 200 is configured for different modes of operation which may be associated with different display and/or device orientations. In the first mode of operation, the display is viewed in a first position, illustrated generally in FIG. 2 in which it covers an alphanumeric keyboard 305 (illustrated in FIG. 3). In this first position, the display is located flush within the boundary defined by the non-display portions of the data processing device 200.

By contrast, the display is illustrated in a second position in FIG. 3, in which the alphanumeric keyboard 305 is exposed and usable for data entry. In one embodiment, the second position of the display corresponds to a second mode of operation (i.e., a text entry mode). As shown in FIG. 3, in one embodiment, the display slides from the first position to the second position in a direction substantially parallel to a plane defined by the front surface of the data processing device 200, as indicated by motion arrows 325. The sliding motion may be accomplished via pins or posts (not shown) on the backside of the display 210 that are engaged with tracks 310, 315 located on the face of the data processing device 200 to the left and right of the alphanumeric keyboard 305, respectively.

Figure 1A:
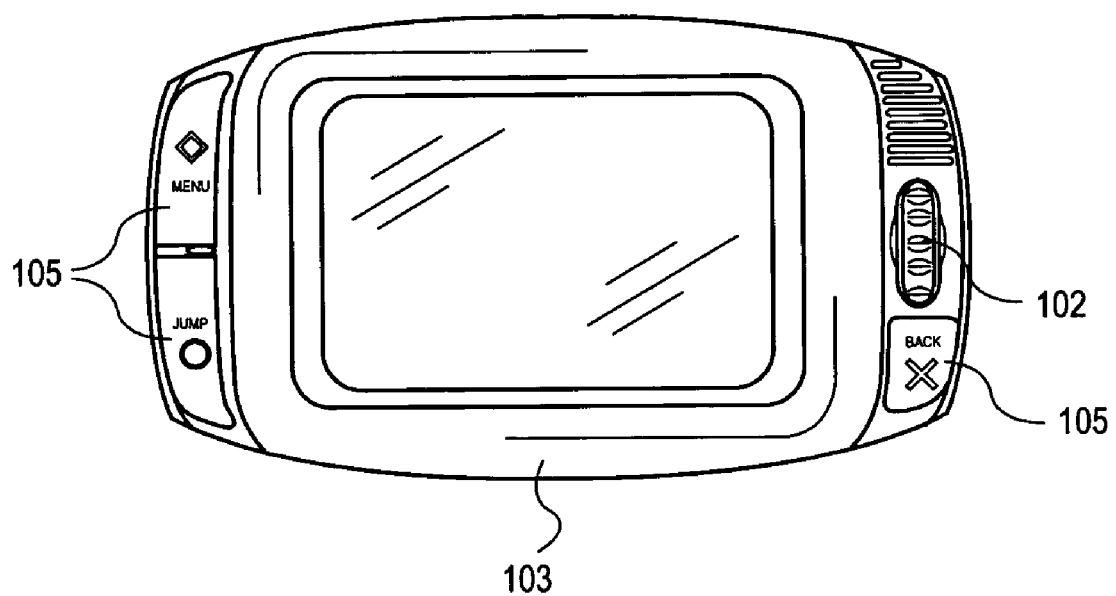
FIGS. 1a–c illustrate a prior art data processing device with an adjustable display.
Figures 1B, 1C:
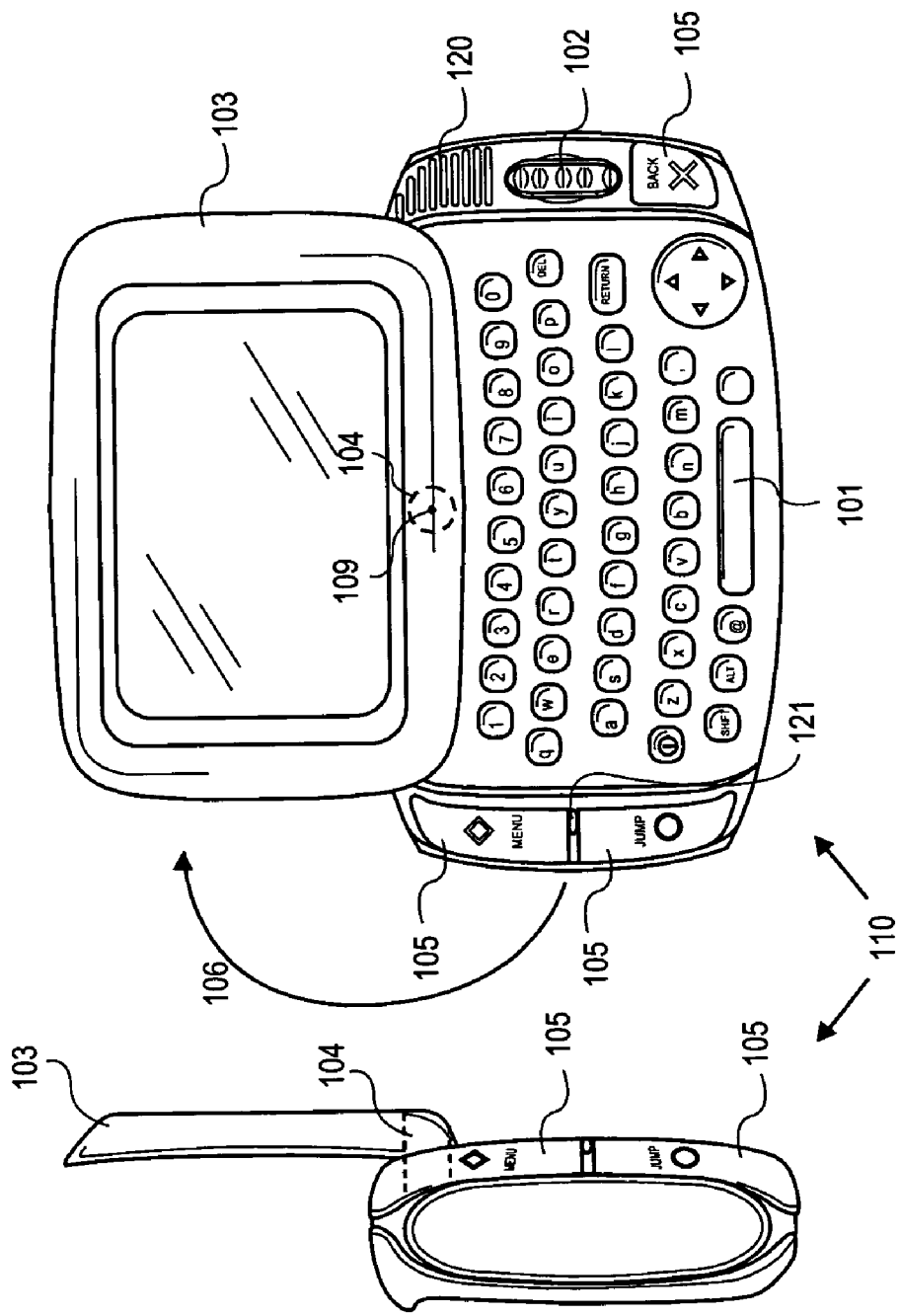

Various additional/alternative mechanisms may be used to guide the display from the first position to the second position (and vice versa). For example, in one embodiment, substantially the same mechanism as illustrated in FIGS. 1a–c is employed to rotate the display from the first position to the second position. In addition, the display 210 may be configured to lift upward at various different angles in relation to the data processing device, both prior to sliding to the second position and/or after it has reached the second position.

In one embodiment, the data processing device 200 includes a first set of control elements 215 positioned to the right of the display 210 and a second set of control elements 220 positioned to the left of the display (i.e., to the right and left while the display in the orientation illustrated in FIG. 2). In one embodiment, the first set of control elements 215 includes a control wheel 230 positioned between two control buttons 226, 235, as illustrated. As in prior embodiments of the invention, the control wheel 230 may be used to move a cursor control device, highlight bar or other selection graphic on the display to select menu items, program icons and/or other graphical or textual display elements. In one embodiment, the control wheel 230 is made of clear plastic with an light emitting diode ("LED") or other light source embedded therein.

In one embodiment, the first control button 226, located above the control wheel 230, is a "page up" button for generating "page up" control functions. For example, when a word processing document, Web page, email message or other type of document is displayed in the foreground of the display 205, selection of the first control button 226 will jump upward through the displayed data/images by a full display screen's worth of data/images. When navigating through menus, selection of the first control button 226 may cause a selection element to jump multiple menu items or other graphical elements. Various different/additional "page up" functions may be trigged via the first control button 226 while still complying with the underlying principles of the invention. The second control button 235, located below the control wheel 230, is a "page down" button for generating "page down" control functions (e.g., which operate in the same manner as the "page up" control functions but in the opposite direction).

In one embodiment, a series of additional control elements 250, 255, 260, and 270 are configured on the data processing device 200 to provide various additional preprogrammed and/or user-specified control functions. For example, a control element 250 may be a designated "home" key for jumping to the data processing device's main menu, or performing application-specific functions typically associated with a "home" key (e.g., moving a cursor to the beginning of a line in a word processing document). Control element 255 may be a dedicated a "menu" key which generates a context-specific menu when selected (e.g., a different menu may be generated based on which application is currently running). Control keys 260 and 265 may be designated "jump" keys, allowing the user to easily jump to (i.e., execute) a designated application program. The control elements 250, 255, 260 and 265 may be programmed for various alternate and/or additional functions while still complying with the underlying principles of the invention.

In one embodiment, the second set of control elements includes a directional pad 245 having an integrated speaker 246 and/or LED (not shown) (or other light source). In one embodiment, the directional pad 245 is designed in substantially the same manner as the directional pad described in the co-pending application entitled DIRECTIONAL PAD HAVING INTEGRATED ACOUSTIC SYSTEM AND LIGHTING SYSTEM, Ser. No. 10/718,749, Filed Nov. 21, 2003, now U.S. Pat. No. 7,091,957, Issued Aug. 15, 2006, which is assigned to the assignee of the present application.

The directional pad 245 may be used to move a cursor or other selection graphic in any direction on the display to enable selection of menu items, program icons and other graphical or textual display elements. The directional pad 245 may be made of frosted translucent plastic and may be white in color, although other materials and colors may be used. The LED contained in the directional pad may be a tri-color LED that generates a variety of colors to alert the user when an incoming message has been received. In "telephony mode" (described below), the speaker 246 contained in the directional pad 245 enables the user to hear the party on the other end of a call. In addition, a microphone 240 is configured at the end of the data processing device 200 opposite the speaker 246 so that the data processing device 200 may be held like a mobile phone while in telephony mode (i.e., when the speaker placed next to the user's ear, the microphone is located in the proximity of the user's mouth).

In one embodiment, when in "telephony mode" the functions performed by the various control elements 215, 220 and/or keys on the keypad 305 change to designated telephony functions. For example, in the telephony mode of operation, the control button 226 above the scroll wheel may function as a "call" button with which the user may initiate a telephone call once the number to be called has been entered. The control button 225 below the scroll wheel 230 may function as a "hang up" button, with which the user may conclude a telephone call. Similarly, referring to FIG. 3, to simplify numeric data entry when in telephony mode, a designated set of alphanumeric keys 320 from the keyboard 305 may change to a numeric keypad (e.g., the 'y' key may change to a '1' key, the 'u' key may change to a '2' key, . . . etc).

In addition, the glyphs on the control elements 215, 220 and/or keys on the keypad 305 may change to reflect the change in operation in the same or a similar manner as described in the embodiments above. For example, light emitted by LEDs embedded within the control buttons 225 and 226 on either side of the scroll wheel 230 may be modified to reflect the change in operation in telephony mode. In one embodiment, for example, the "call" and "hang up" glyphs are highlighted on the control buttons 225 and 226, in contrast to "page up" and "page down" glyphs, respectively.

In one embodiment, two-color LEDs are employed within the keys of the alphanumeric keyboard 305. When the data processing device is not in telephony mode, both colors of the two-color LEDs are illuminated under all of the alphanumeric keys 305, thereby highlighting the standard set of alphanumeric glyphs on the keys. For example, if the two-color LEDs are red and green, the combination will generate an amber color beneath the alphanumeric keys 305. By contrast, when in telephony mode, only one color of each of the two-color LEDs is illuminated. Moreover, in one embodiment, the one LED is illuminated only beneath each of the designated set of numeric keypad keys 320 (as opposed to illuminating the one LED beneath each of the entire alphanumeric keyboard 305). By way of example, if only the green LEDs are illuminated beneath each of the designated set of keys 320, then the numeric keypad glyphs (i.e., numbered 1–9) will be illuminated with a green color in contrast to the standard alphanumeric glyphs.

Figure 4A:
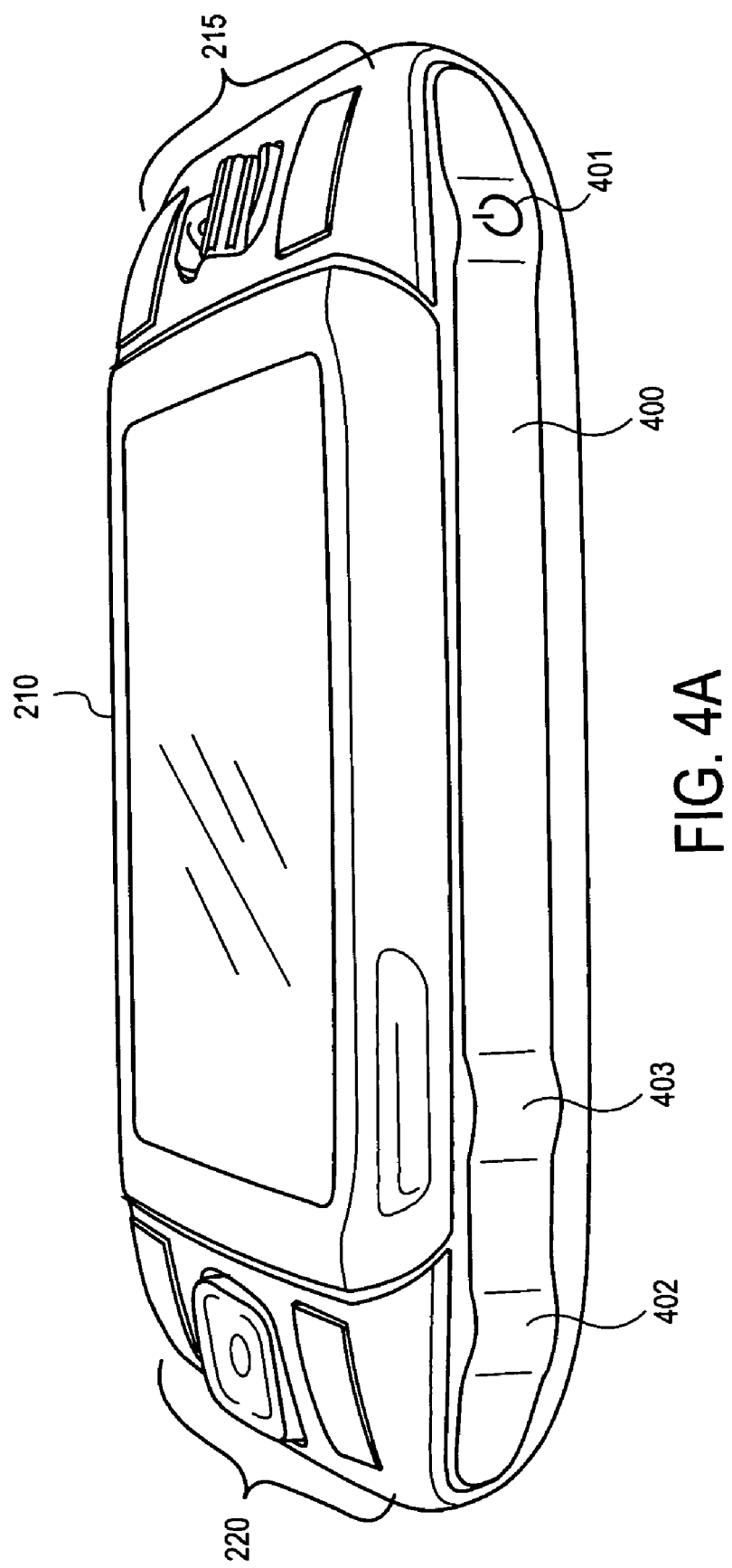
FIGS. 4a–c illustrate one embodiment of a data processing device which includes a first protective detachable bumper.
Figure 4B:
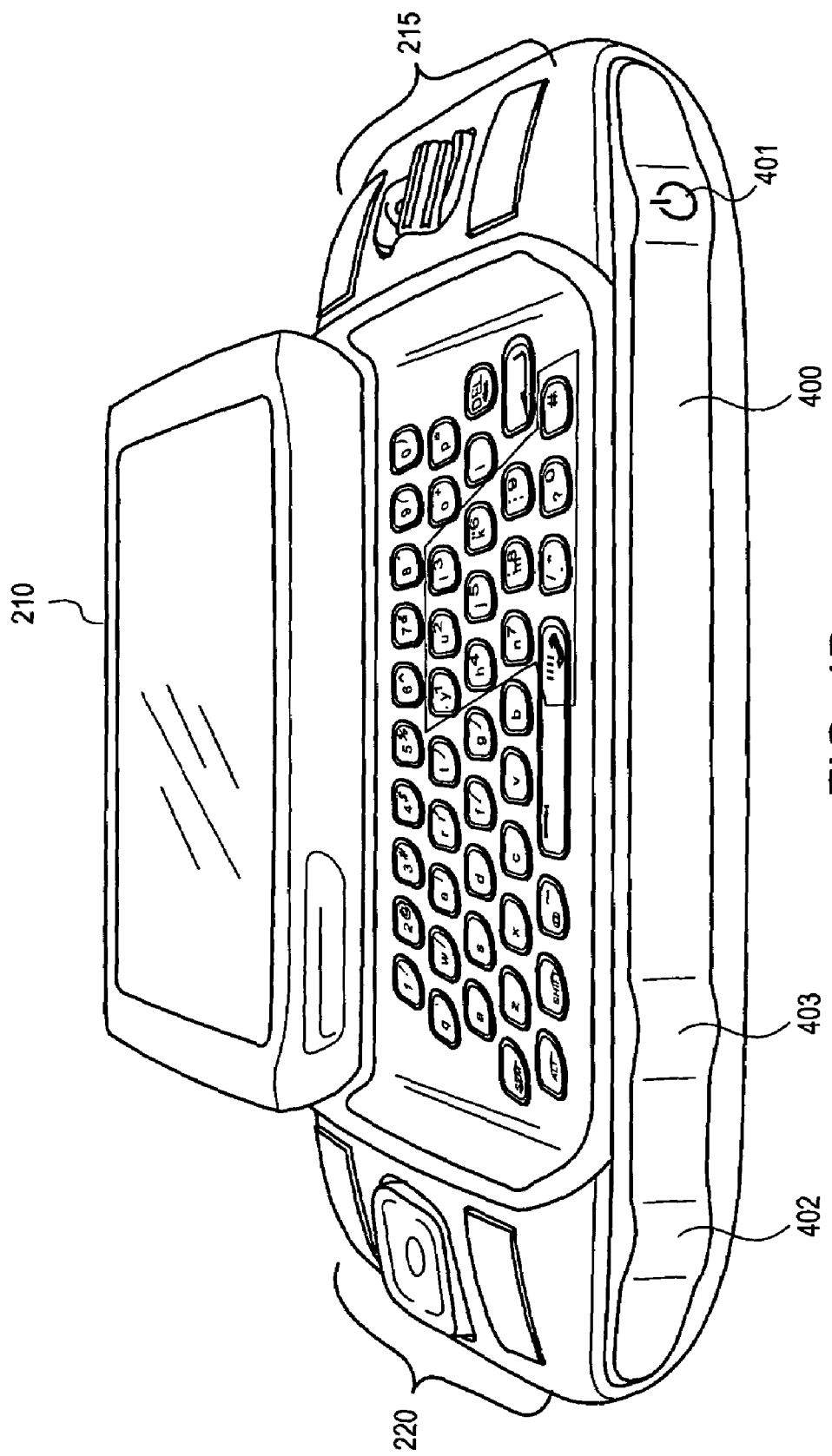

In one embodiment of the invention, one or more detachable bumpers are provided to protect the data processing device and to provide additional user interface features. A first bumper 400 is illustrated attached to one side of the data processing device 200 in FIGS. 4a–b and detached from the data processing device in FIG. 4c. The bumper 400 includes a set of additional input elements 401–403 which allow the user to control the data processing device in various ways. In the particular embodiment shown in FIGS. 4a–c, the bumper 400 includes a power input element 401 which, when selected by the user, causes the data processing device to power on/off; and first and second volume input elements 402 and 403, which, when selected, cause the audio volume generated by the speaker 246 (or optional headset), to increase or decrease, respectively. Each of the input elements 401–403 are formed as small bumps on the surface of the bumper 400, thereby facilitating selection by the end user.

Figure 4C:
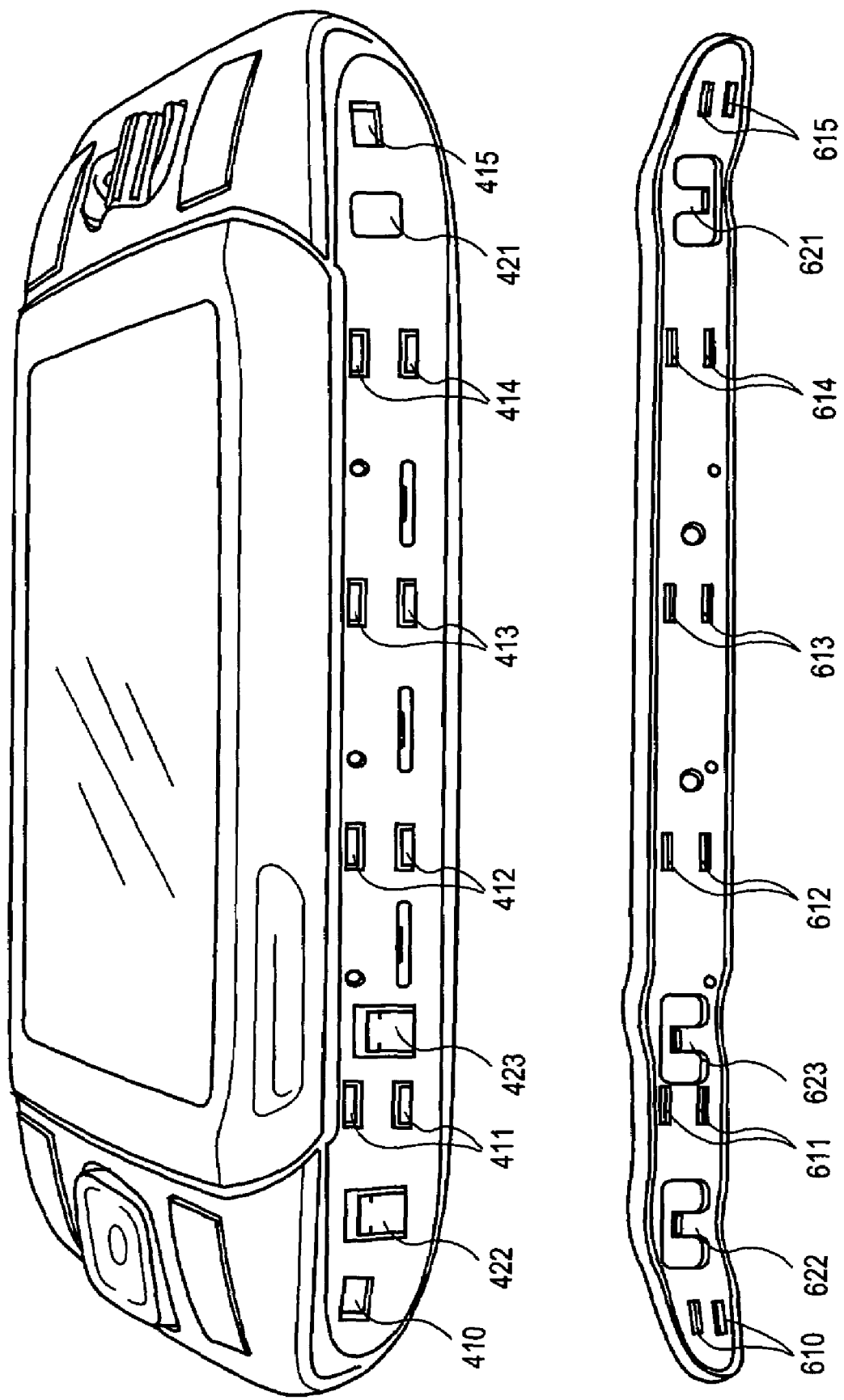
Figure 6:
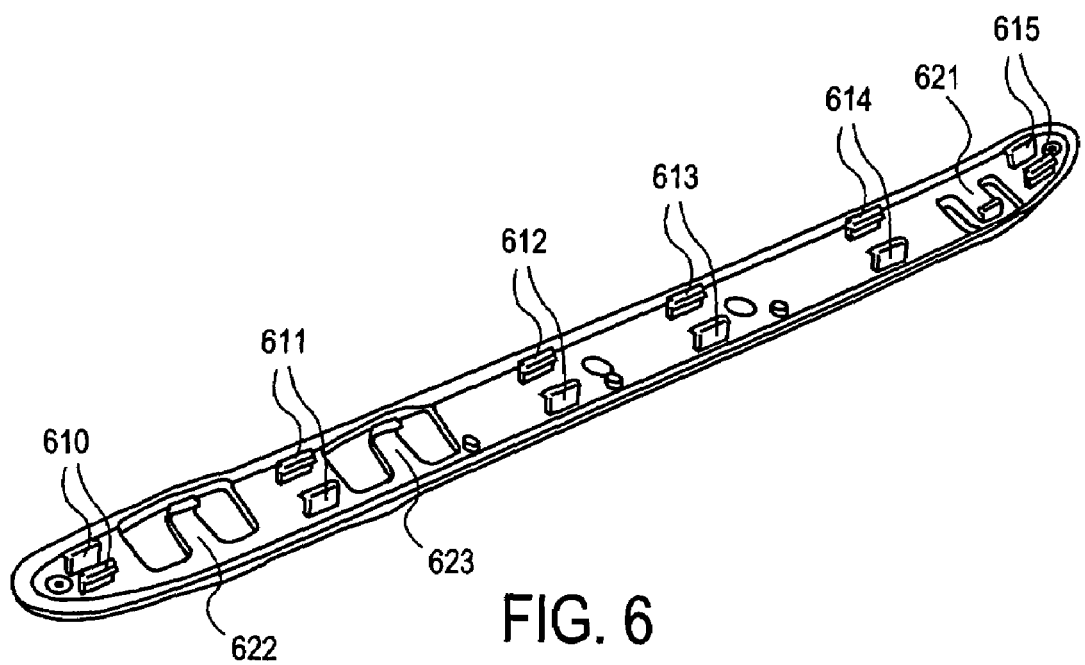
FIGS. 6–7 illustrate attachment elements employed on the underside of the first and second detachable bumper, respectively.
Figure 7:
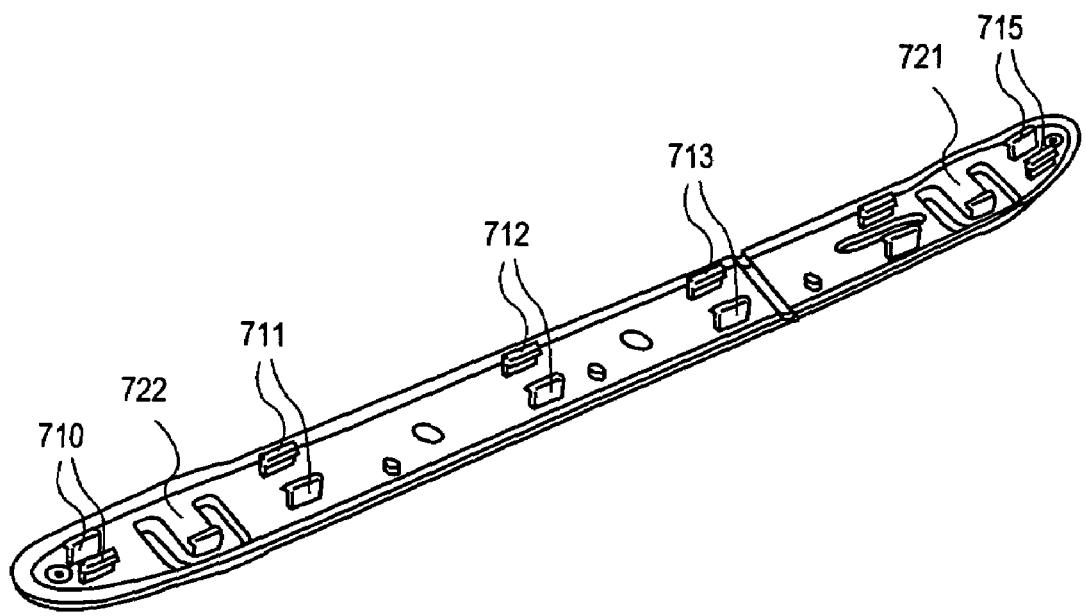

FIGS. 6 and 4c illustrate the underside of the bumper 400 and the manner in which the bumper is attached to the data processing device 200 according to one embodiment of the invention. This embodiment includes a series of attachment elements 610–615 formed on the undersurface of the bumper 400 which protrude outward from the undersurface. Each attachment element 610–615 is bent at the top, thereby forming a hook for engaging with one of a plurality of rectangular holes 410–415 formed on the body of the data processing device 200. The bumper is attached to the data processing device by aligning each of the attachment elements 610–615 with the corresponding holes 410–415 and applying force to push the attachment elements 610–615 into the holes 410–415 (i.e., when inserted into a hole, each hooked attachment element engages with the undersurface of the surface in which the hole is formed).

In addition, a contact element 621–623 is formed on the underside of the bumper 200 for each input element 401–403. In the particular example illustrated in FIGS. 4a–c, input element 401 corresponds to contact element 621, input element 402 corresponds to contact element 622, and input element 403 corresponds to contact element 623.

In operation, when the bumper is attached to the data processing device (as described above), each contact element 621–623 is positioned adjacent to one of a plurality of contact surfaces 421–423. Forces applied by the user to each input element 401–403 are then translated through the corresponding contact element 621–623, respectively, to each respective contact surface 421–423, thereby triggering a switch (or other electrical or mechanical element) associated with the contact surface. In response, the data processing device performs the operation associated with the corresponding input element 401–403 (e.g., raising or lowering the volume, powering on/off the data processing device, etc).

In one embodiment, the contact surfaces 421–423 are actuator bumps which, when depressed, activate a corresponding micro-switch (not shown) within the data processing device 200. It should be noted, however, that the underlying principles of the invention are not limited to any particular type of contact surface and/or switching element.

Figure 5A:
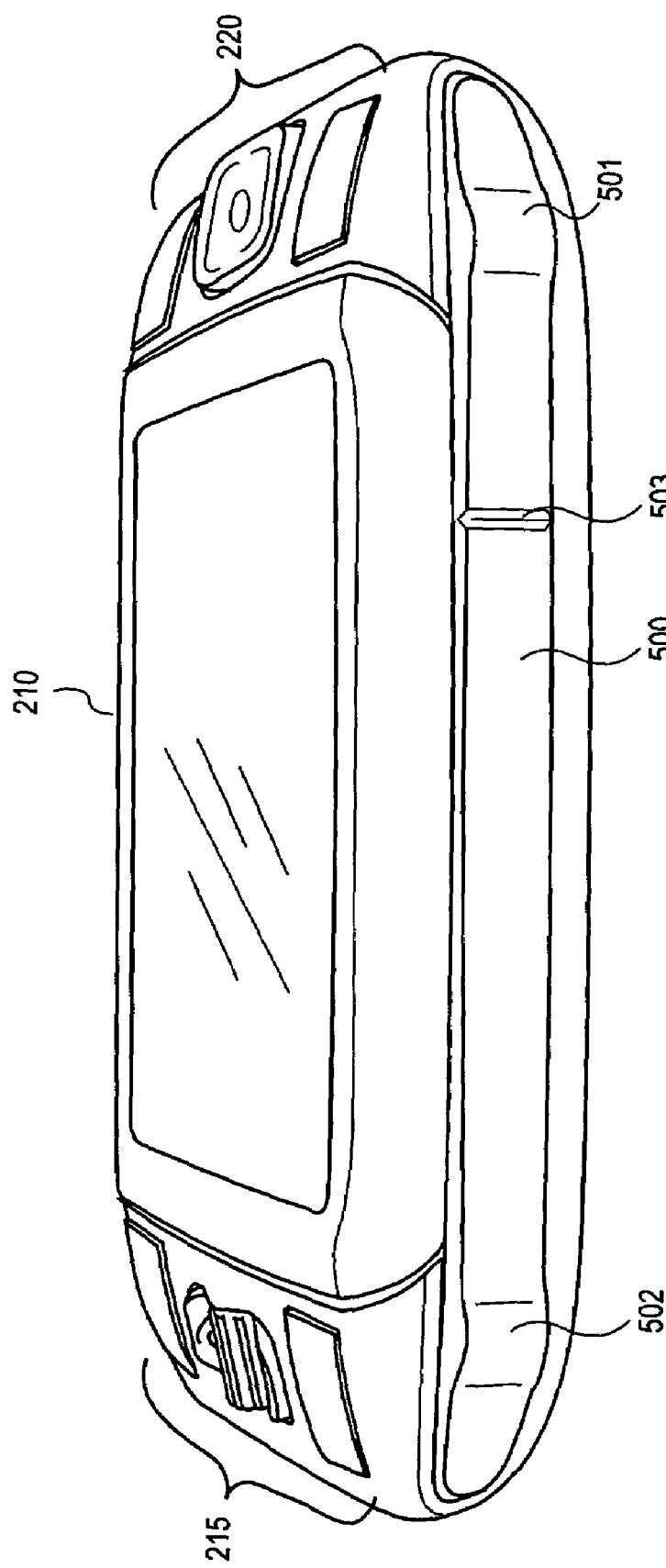
FIGS. 5a–b illustrate one embodiment of a data processing device which includes a second protective detachable bumper.
Figure 5B:
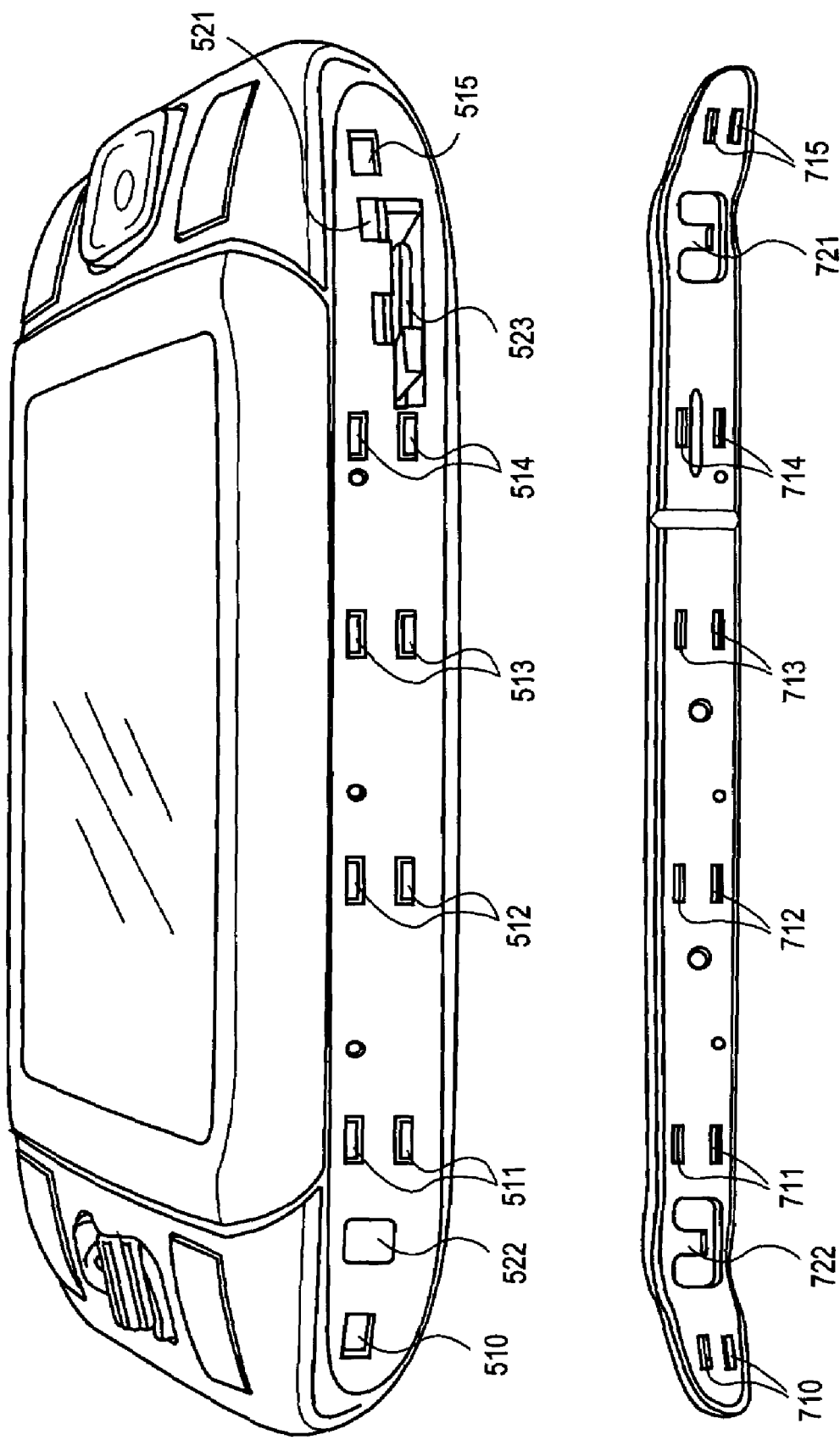

A second bumper 500 is illustrated attached to another side of the data processing device 200 in FIG. 5a, and detached from the data processing device in FIG. 5b. Two additional input elements 501–502 are formed on the outer surface of the second bumper 500 and are assigned one or more additional user input functions.

As with the first bumper 400, a series of attachment elements 710–715 formed on the undersurface of the second bumper 500 protrude outward from the undersurface. In addition, like the first bumper, the second bumper 500 is attached to the data processing device by aligning each of the attachment elements 710–715 with corresponding holes 510–515 and applying force to push the attachment elements 710–715 into the holes 510–515.

Contact elements 721 and 722 formed on the underside of the bumper 500 correspond to each input element 501 and 502, respectively. Like the first bumper, when the second bumper 500 is attached to the data processing device 200, each contact element 721–722 is positioned adjacent to a contact surface 521–522, respectively. Accordingly, forces applied by the user to each input element 501–502 are translated through the corresponding contact element 721–722, respectively, to each respective contact surface 521–522, thereby triggering a switch (or other electrical or mechanical element) associated with the contact surface. In response, the data processing device performs the operation associated with the corresponding input element 501–502.

In one embodiment, an opening or slot 523 is configured adjacent to contact surface 521 for receiving a programmable card such as a flash memory card or a Subscriber Identity Module ("SIM") card. To facilitate entry of the card, the slot may be exposed by detaching a potion of the bumper comprising contact element 721, and attachment elements 714–715 (i.e., detaching attachment elements 714–715 from the data processing device).

Figure 8:
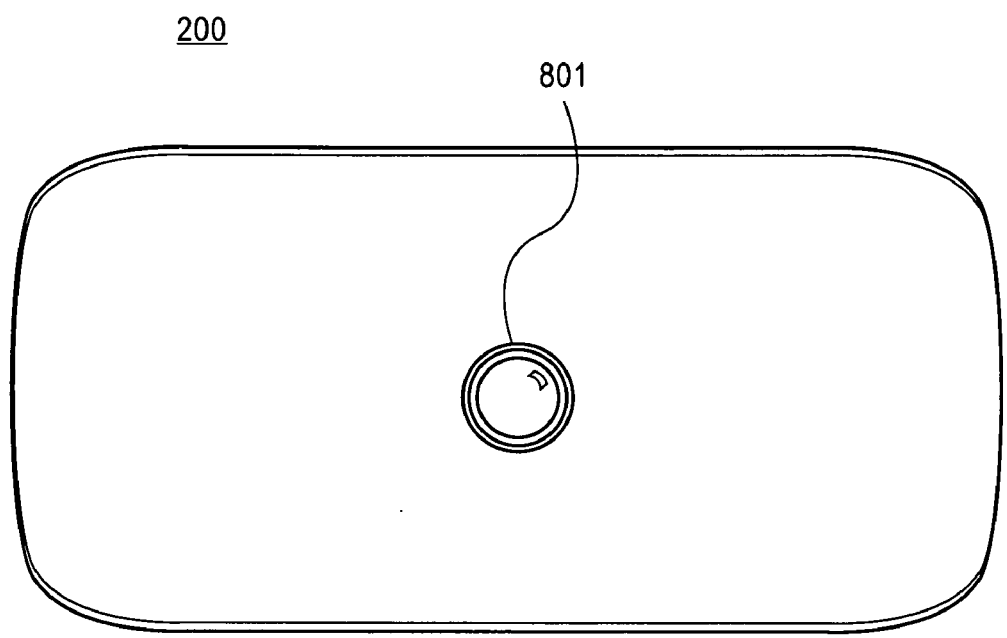
FIG. 8 illustrates the underside of one embodiment of the data processing device which includes a camera lens.

In one embodiment, the functions associated with the two input elements 501–502 change based on the current operational state of the data processing device 200. For example, when the data processing device is in "camera" mode, input element 502 performs the operation of a camera shutter for snapping pictures (FIG. 8 illustrates one embodiment in which a camera lens 801 is positioned on the underside of the data processing device 200). By contrast, when the data processing device 200 is in "telephone" mode, the input element 502 may be configured to perform a mute function (i.e., turning off the integrated microphone 240 when selected). In addition, when in telephone mode, input ele ment 501 may be configured to select speakerphone operation. Moreover, when the user is playing a video game, the functions performed by each of the input elements 401–403, 501,502 may be configured specifically for the video game. As mentioned above, however, the underlying principles of the invention are not limited to any particular mapping of functions to input elements. Moreover, in one embodiment, the functions mapped to each of the input elements 401–403, 501,502 are configurable by the end user.

In one embodiment, the bumpers 400, 500 are made of rubber of other material suitable for protecting the data processing device and providing user input. In addition, the bumpers 400, 500 may be produced in a variety of different colors from which end users may choose based on their individual preferences. In one embodiment, the bumpers are produced and sold separately from the data processing device. However, the underlying principles of the invention are not constrained by the manner in which the bumpers are produced and/or sold.

Moreover, it will be noted that the embodiments of the invention described herein have a wider applicability than for the attachment of bumpers. That is, various additional external devices may be configured to interface with the holes 410–415 and 510–515 on the data processing device. These devices may include, for example, device holsters, belt connectors, and data processing cradles, to name a few. An alternative outer protective covering may be configured to wrap around the bottom of the data processing device and connect through both sets of holes 410–415 and 510–515, thereby protecting the bottom of the data processing device as well as the sides.

Throughout the foregoing description, for the purposes of explanation, numerous specific details were set forth in order to provide a thorough understanding of the invention. It will be apparent, however, to one skilled in the art that the invention may be practiced without some of these specific details. For example, while the embodiments described above employ a dual bumper configuration wherein bumpers are affixed to a data processing device on opposite sides of the data processing device, various other configurations are contemplated in accordance with the underlying principles of the invention. In addition, while the embodiments described above employ a specific mechanism for attaching bumpers to a data processing device, the underlying principles of the invention are not limited to any particular attachment mechanism. Accordingly, the scope and spirit of the invention should be judged in terms of the claims which follow.

What is claimed is:

1. An apparatus comprising:
  a bumper for attaching to and protecting a data processing device, the bumper including one or more input elements formed thereon, the input elements, when selected by a user, to cause the data processing device to perform a plurality of defined functions;
  one or more attachment elements configured to interface with portions of the data processing device, the attachment elements thereby coupling the bumper to the data processing device; and
  a contact element associated with each of the input elements, each contact element to interface with contact surfaces on the data processing device, thereby triggering a predefined operation on the data processing device.

2. The bumper as in claim 1 wherein the predefined operation is changing the volume of a speaker on the data processing device.

3. The bumper as in claim 1 wherein the predefined operation is activating a camera shutter on the data processing device.

4. The bumper as in claim 1 wherein the contact surfaces comprise actuator bumps configured on the data processing device.

5. An apparatus comprising:
  a bumper for attaching to and protecting a data processing device, the bumper including one or more input elements formed thereon, the input elements, when selected by a user, to cause the data processing device to perform a plurality of defined functions; and
  one or more attachment elements configured to interface with portions of the data processing device, the attachment elements thereby coupling the bumper to the data processing device;
  wherein one or more of the attachment elements comprise a hook for engaging with one of a plurality of holes formed on a body of the data processing device.

6. An apparatus comprising:
  a bumper for attaching to and protecting a data processing device, the bumper including input element means formed thereon, the input element means, when selected by a user, to cause the data processing device to perform a plurality of defined functions;
  attachment means configured to interface with portions of the data processing device, the attachment means thereby fixedly coupling the bumper to the data processing device; and
  contact element means associated with each of the input elements, each contact element means to interface with contact surfaces on the data processing device, thereby triggering a predefined operation on the data processing device.

7. The bumper as in claim 6 wherein one or more of the attachment means comprise a hook for engaging with one of a plurality of holes formed on a body of the data processing device.

8. The bumper as in claim 6 wherein the predefined operation is changing the volume of a speaker on the data processing device.

9. The bumper as in claim 6 wherein the predefined operation is activating a camera shutter on the data processing device.

10. The bumper as in claim 6 wherein the contact surface means comprise actuator bumps configured on the data processing device.

11. A system comprising:
  a data processing device to perform one or more data processing and or communications operations;
  a detachable bumper for attaching to and protecting the data processing device, the bumper including one or more input elements formed thereon, the input elements, when selected by a user, to cause the data processing device to perform a plurality of defined functions; and
  one or more attachment elements configured to interface with portions of the data processing device, the attachment elements thereby coupling the bumper to the data processing device;
  wherein one or more of the attachment elements comprise a hook for engaging with one of a plurality of holes formed on a body of the data processing device.

12. A system comprising:
  a data processing device to perform one or more data processing and or communications operations;

a detachable bumper for attaching to and protecting the data processing device, the bumper including one or more input elements formed thereon, the input elements, when selected by a user, to cause the data processing device to perform a plurality of defined functions;

one or more attachment elements configured to interface with portions of the data processing device, the attachment elements thereby coupling the bumper to the data processing device; and a contact element associated with each of the input elements, each contact element to interface with contact surfaces on the data processing device, thereby triggering a predefined operation on the data processing device.

13. The system as in claim 12 wherein the predefined operation is changing the volume of a speaker on the data processing device.

14. The system as in claim 12 wherein the predefined operation is activating a camera shutter on the data processing device.

15. The system as in claim 12 wherein the contact surfaces comprise actuator bumps configured on the data processing device.

* * * * *